US006975614B2

(12) United States Patent
Kennedy

(10) Patent No.: US 6,975,614 B2
(45) Date of Patent: Dec. 13, 2005

(54) INTELLIGENT COMMUNICATION NODE OBJECT BEACON FRAMEWORK IN A MOBILE AD HOC NETWORK

(75) Inventor: Robert A. Kennedy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 159 days.

(21) Appl. No.: 10/235,242

(22) Filed: Sep. 4, 2002

(65) Prior Publication Data

US 2004/0042417 A1 Mar. 4, 2004

(51) Int. Cl.[7] .............................................. H04Q 7/24
(52) U.S. Cl. ..................................................... 370/338
(58) Field of Search ............................. 370/252, 255, 370/313, 328, 329, 332

(56) References Cited

U.S. PATENT DOCUMENTS

| 5,412,654 | A | | 5/1995 | Perkins | |
|---|---|---|---|---|---|
| 5,987,011 | A | * | 11/1999 | Toh | 370/331 |
| 6,304,556 | B1 | | 10/2001 | Haas | 370/254 |
| 6,385,174 | B1 | | 5/2002 | Li | 370/252 |
| 6,456,599 | B1 | * | 9/2002 | Elliott | 370/254 |
| 6,512,935 | B1 | * | 1/2003 | Redi | 455/574 |
| 6,745,027 | B2 | * | 6/2004 | Twitchell, Jr. | 455/422.1 |
| 6,754,192 | B2 | * | 6/2004 | Kennedy | 370/331 |
| 6,763,013 | B2 | * | 7/2004 | Kennedy | 370/338 |
| 6,763,014 | B2 | * | 7/2004 | Kennedy | 370/338 |
| 2001/0033556 | A1 | | 10/2001 | Krishnamurthy et al. | 370/329 |
| 2001/0043148 | A1 | * | 11/2001 | Stewart | 707/100 |
| 2002/0013129 | A1 | * | 1/2002 | Davies | 455/41 |
| 2002/0131386 | A1 | * | 9/2002 | Gwon | 370/338 |
| 2003/0016732 | A1 | * | 1/2003 | Miklos et al. | 375/132 |
| 2003/0128690 | A1 | * | 7/2003 | Elliott et al. | 370/351 |
| 2004/0018839 | A1 | * | 1/2004 | Andric et al. | 455/433 |
| 2004/0042417 | A1 | * | 3/2004 | Kennedy | 370/255 |
| 2004/0218548 | A1 | * | 11/2004 | Kennedy et al. | 370/254 |
| 2004/0218582 | A1 | * | 11/2004 | Kennedy et al. | 370/351 |
| 2004/0219909 | A1 | * | 11/2004 | Kennedy et al. | 455/422.1 |

OTHER PUBLICATIONS

Mirhakkak et al., *Dynamic Quality-of-Service for Mobile Ad Hoc Networks*, MITRE Corp., 2000.
Van Dyck et al., *Distributed Sensor Processing Over an Ad-Hoc Wireless Network: Simulation Framework And Performance Criteria*, Proceedings IEEE Milcom, Oct. 2001.
Zhu, *Medium Access Control and Quality-of-Service for Mobile Ad Hoc Networks*, PHD Thesis, Department of Computer Engineering, University of Maryland, College Park, MD, 2001.

(Continued)

*Primary Examiner*—Chi Pham
*Assistant Examiner*—Anh-Vu H Ly
(74) *Attorney, Agent, or Firm*—Allen, Dyer, Doppelt, Milbrath & Gilchrist, P.A.

(57) ABSTRACT

The mobile ad hoc network includes a plurality of wireless mobile nodes and a plurality of wireless communication links connecting the nodes together. The method includes node advertisement, or group of mobile nodes, in the mobile ad hoc network. The group of mobile nodes includes a temporary or permanent association of two or more of the plurality of mobile nodes. The method includes transmitting node/group information using a beacon signal, determining a node/group condition of the corresponding mobile node or group of nodes, and varying the beacon signal based upon the determined condition.

44 Claims, 3 Drawing Sheets

OTHER PUBLICATIONS

Royer et al., *A Review of Current Routing Protocols for Ad Hoc Mobile Wireless Networks*, IEEE Personal Communications, Apr. 1999, pp. 46-55.

Corson et al., *A Reservation-Based Multicast (RBM) Routing Protocol for Mobile Networks: Initial Route Constructions Phase*, ACM/l. 1, No. 4, 1995, pp. 1-39.

Xiao et al., *A Flexible Quality of Service Model for Mobile Ad Hoc Networks*, IEEE VTC2000-spring, Tokyo, Japan, May 2000.

Wu et al., *QoS Support in Mobile Ad Hoc Networks*, Computing Science Department, University of Alberta, no date available.

Corson et al., *Mobile Ad Hoc Networking (MANET) : Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol* (IERP) for Ad Hoc Networks, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On-Demand Distance Vector Routing*, Internet Engineering Task Force (IETF) MANET Working Group, Internet Draft, Jul. 2000.

Park et al., *Temporally-Ordered Routing Algorithm (TORA) Versoin 1 Functional Specification*, Internet Engineering Task Force (IETF) MANET Working Group, Internet Draft, Jul. 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad Hoc On-Demand Distance Vector (ADOV) Routing*, Internet Engineering Task Force (IETF) MANET Working Group, Internet Draft, Nov. 9, 2001.

Chakrabarti et al., "*QoS Issues in Ad Hoc Wireless Networks*", , IEEE Communications Magazine, (Feb. 2001), pp. 142-148.

Chen, "*Routing Support for Providing Guaranteed End-to-End Quality-of-Service,*" Ph.D. thesis, Univ. of Illinois at Urbana-Champaign, http://cairo.cs.uiuc.edu/papers/Scthesis.ps. 1999.

* cited by examiner

INTELLIGENT COMMUNICATION NODE OBJECT BEACON FRAMEWORK IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

A rapidly developing area of wireless networks is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. A pure mobile ad hoc network is formed of mobile nodes only, and a network is created on the fly as the nodes transmit to or receive from other nodes. Node movement patterns may be anywhere from continuous to start-stop type patterns. The network does not in general depend on a particular node and dynamically adjusts as some nodes join or others leave the network.

An ad hoc network can be quickly deployed and provide much needed communications. Ad hoc networks will allow people to exchange data in the field or in a class room without using any network structure except the one they create by simply turning on their computers or PDAs, for example.

New applications for mobile ad hoc networks will continue to emerge and become an important part of the communication structure. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to proactive protocols which maintain routes to all destinations at periodic time intervals. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

Existing communication node advertisement and communication node neighbor discovery approaches including those for ad hoc networks, only use network-condition-independent mechanisms such as constant transmit rate or random transmit rate "hello" messages from nodes to announce, or advertise, their presence. These transmitted announcements are called "beacons" and conventional approaches do not endow these beacons with any degree of intelligence. Other nodes may detect these beacons and either form a network from scratch, add the newly-detected node to the existing network, or disallow further communications to this newly-detected node.

SUMMARY OF THE INVENTION

In view of the foregoing background, it is therefore an object of the present invention to provide the general framework, called the "Intelligent Communication Node Object Beacon Framework" (ICBF), for intelligent, adaptive advertisement by any communications node object of its presence and/or the corresponding detection (neighbor discovery) by another node object or the network of those node objects transmitting such beacons.

This and other objects, features, and advantages in accordance with the present invention are provided by a method for advertisement of presence by a mobile node or by a group of mobile nodes, in a mobile ad hoc network. The mobile ad hoc network includes a plurality of wireless mobile nodes and a plurality of wireless communication links connecting the nodes together. The group of mobile nodes includes a temporary or permanent association of two or more of the plurality of mobile nodes. The method includes transmitting node/group information using a beacon signal, determining a node/group condition or set of conditions of the corresponding mobile node or group of nodes, and varying the beacon signal based upon the determined condition or set of conditions. The beacon signal includes information relating to a status of the corresponding mobile node or group of nodes.

Varying the beacon signal preferably includes varying transmission rate, transmission frequency and transmission pattern. Also, the condition preferably includes node/group movement, such as node velocity, node acceleration and/or node movement pattern of the corresponding mobile node.

Here, varying the beacon signal includes increasing the transmission rate based upon increased node movement. The node movement may be determined using global positioning satellites (GPS), local landmarks, triangulation, and/or by measuring inertia of the mobile node.

The condition may also or alternatively include quality of service (QoS), such as error rate and/or available bandwidth. Here, varying the beacon signal may include increasing the transmission rate and/or changing the transmission frequency based upon decreased QoS. The transmission rate of the beacon signal should not exceed a rate threshold based upon available bandwidth. Group beacon signals are transmitted by a subset of mobile nodes of the group of mobile nodes. Such a subset includes a range from one mobile node to all the mobile nodes of the group. Also, the beacon signals may include information relating to a status of the mobile ad hoc network, such as information about the links between the nodes of the network.

Objects, features, and advantages in accordance with the present invention are also provided by a mobile ad hoc network including a plurality of wireless mobile nodes, and a plurality of wireless communication links connecting the nodes together. Each mobile node includes a communications device to wirelessly communicate with other nodes of the plurality of nodes via the wireless communication links, and a controller to route communications via the communications device. The controller includes at least a beacon signal generator to generate and transmit status signals, and a condition determining unit to determine a condition of the mobile node. The beacon signal generator varies the beacon signal based upon the determined condition of the mobile node. Again, the beacon signal includes information relating to a status of the mobile node.

The beacon signals may further include information relating to a status of a group of mobile nodes which are a temporary or permanent association of at least two of the plurality of mobile nodes. Here, the condition determining unit further determines a condition of the group of mobile nodes, and the beacon signal generator varies the beacon signal based upon the determined condition of the group of mobile nodes. The beacon signal generator may vary the transmission rate, transmission frequency and/or transmission pattern of the beacon signal.

The node condition may include node movement, and the beacon signal generator may vary beacon signal by increasing the transmission rate based upon increased node movement and decreasing the transmission rate based upon decreased node movement. The node movement includes node velocity, node acceleration and/or node movement pattern of the corresponding mobile node or group of nodes. The condition determining unit may comprise a global positioning satellite (GPS) device for determining the node movement, and/or may determine the node movement using local landmarks, by tracking the relative velocity using triangulation and/or by measuring inertia of the mobile node.

Furthermore, the node condition may include quality of service (QoS), and the beacon signal generator varies the beacon signal by increasing the transmission rate and/or changing the transmission frequency based upon decreased QoS. The beacon signal generator should not increase the transmission rate of the beacon status signals beyond a rate threshold based upon available bandwidth. Again, the beacon signals may also include information relating to a status of the mobile ad hoc network, such as information about the links connecting the nodes of the network.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

Figure 1:
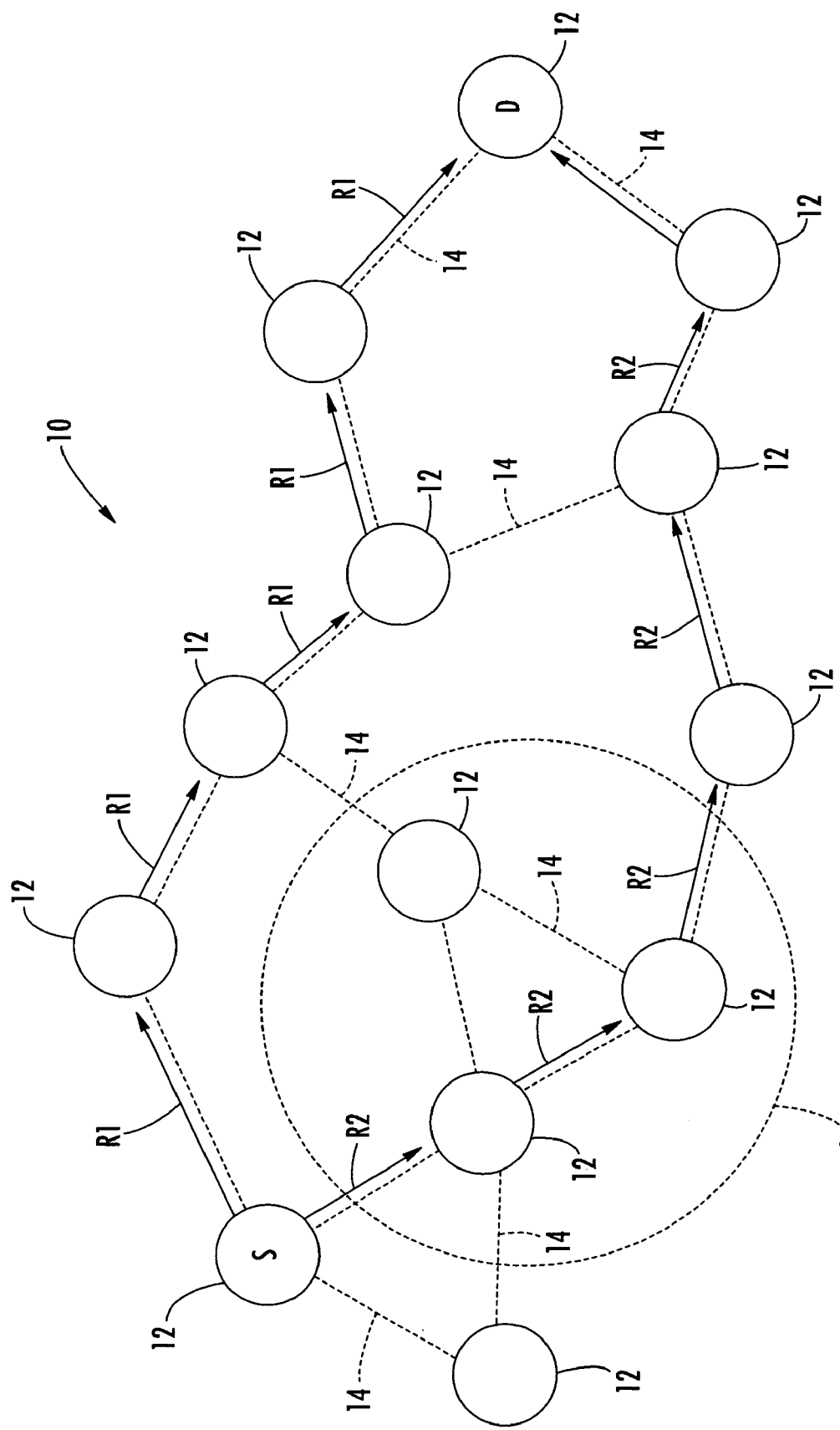
FIG. 1 is a schematic diagram of a mobile ad hoc network in accordance with the present invention.
Figure 2:
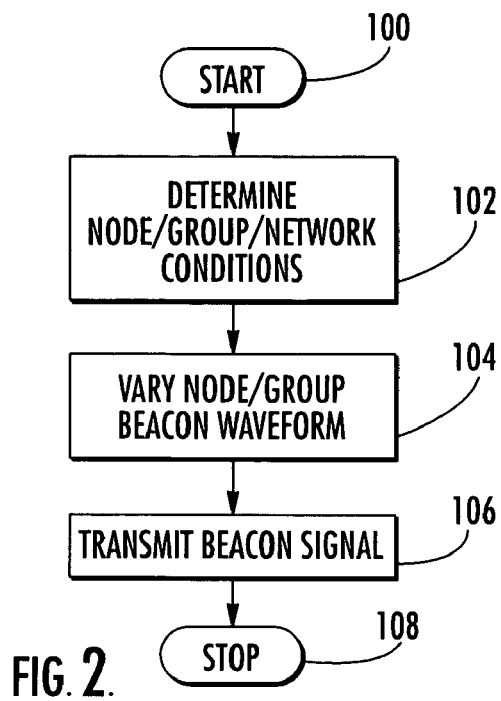
FIG. 2 is a flowchart illustrating the steps of a method for node advertisement by a mobile node, or group of mobile nodes, in a mobile ad hoc network in accordance with the present invention.

Referring initially to FIGS. 1 and 2, a method for node advertising in a mobile ad hoc network 10 will now be described. The network 10 includes a plurality of mobile nodes 12 including the source node S and the destination node D with intermediate nodes there between. The nodes 12, such as laptop computers, personal digital assistants (PDAs) or mobile phones, are connected by wireless communication links 14 as would be appreciated by the skilled artisan.

A description of a problem follows. A snapshot of a mobile ad hoc network 10 is shown in FIG. 1. Through route discovery, two routes R1 and R2 have been identified from the Source Node S to the Destination Node D. The second route R2 has been identified by the source node S as its primary route to the destination node D. The first route R1 will only be used if the second route R2 becomes invalid.

Conventionally, each of the nodes 12 in both routes R1 and R2 including the source node S and the destination node D would transmit neighbor discovery beacons at some constant periodic rate. If some nodes 12 in route R2 move too fast and end up out of the range of an adjacent node 12 in the route before the next beacon transmissions from these nodes, the beacon transmission rates (also called beacon rates) cannot therefore keep up with the rate at which the source node S needs to update its route table or route cache.

Since the source node S would falsely believe that route R2 is valid, it would attempt to send information to the destination node D using this route R2. Therefore, some links 14 and nodes 12 would become tied up performing a task which cannot be completed. This would result in lost time and inefficient use of network 10 bandwidth. Retransmission along the route R1 would then be necessary or the discovery of an entirely new route would be required if a straying node 12 was common to both the routes R1 and R2. This results in lost time, a potentially critical problem, discovering valid routes from the source node S to the destination node D.

As mentioned, an object of the present invention is to provide the general framework, called the "Intelligent Communication Node Object Beacon Framework" (ICBF), for intelligent, adaptive advertisement by any communications node object of its presence and/or the corresponding detection (neighbor discovery) by another node object or the network of those node objects transmitting such beacons. Also, conventional beacon schemes do not extend the notion of node beacons and node neighbor discovery to temporary or permanent associations of nodes potentially capable of communication with other temporary or permanent associations of nodes. ICBF defines any such generalized node association as "Node Communication Object Association:" (NCOA) and the corresponding beacons for this association as "NCOA beacons". In the network 10 shown in FIG. 1, a group G (NCOA) of mobile nodes 12 includes a temporary or permanent association of more than one of the plurality of mobile nodes.

The method of the present invention (FIG. 2) begins (block 100) and includes determining a node/group/network condition of the corresponding mobile node 12, group of nodes G or network 10 (block 102), varying the beacon signal waveform based upon the determined condition (block 104), and transmitting node/group/network information using beacon signals (block 106) before ending at block 108. The beacon signals include information relating to a condition of the corresponding mobile node, group of nodes. Also, the beacon signals may include information relating to a condition of the mobile ad hoc network 10, such as information about the status of the links 14 between the nodes 12 of the network. Transmitting beacon signals may further include transmitting beacon signal information using a beacon properties signal to advertise a type of beacon signal being transmitted to the plurality of nodes 12 of the mobile ad hoc network 10.

The beacon signal is preferably made up of transmission rate, transmission frequency and transmission pattern which collectively define the beacon waveform. Also, the condition preferably includes node/group movement, such as velocity, acceleration and/or movement pattern of the corresponding mobile node 12 or group of mobile nodes (NCOA) G. Here, varying the beacon signals includes increasing the transmission rate based upon increased node movement. The node movement may be determined using global positioning satellites (GPS), local landmarks, triangulation, and/or by measuring inertia of the mobile node 12.

The condition may also or alternatively include priority of information and/or quality of service measurements (QoS), such as bit/packet error rate and/or usable available bandwidth. Here, varying the beacon signals may include increasing the transmission rate and/or changing the transmission frequency or pattern based upon decreased QoS or increased priority of information. Likewise, varying the beacon signals may include decreasing the transmission rate and/or changing the transmission frequency or pattern based upon increased QoS or decreased priority of information. The transmission rate of the beacon signals should not exceed a rate threshold based upon available bandwidth. Group beacon signals are transmitted by a subset of mobile nodes 12 of the group G of mobile nodes 12. Such a subset includes a range from one mobile node 12 to all the mobile nodes 12 of the group G. The maximum would be all the mobile nodes 12 of the group G, while the minimum would be only one node 12 of the group G transmitting the beacons.

A method for neighbor discovery (FIG. 3) begins at block 200 and includes defining the initial detection rate, the initial detection frequency and the maximum detection frequency (block 202). At block 204, the method continues with searching for the variable beacon signals at a given mobile node 12 using the initial detection rate and at the initial detection frequency, and (block 206) increasing a detection rate from the initial detection rate up to the maximum detection rate while searching for the variable beacon signals at the initial detection frequency.

The maximum detection rate may be predetermined or set according to a received maximum detection rate transmitted by a neighboring mobile node 12. Also, the detection rate may be increased according to a function defining time varying properties of the variable beacon signal of a neighboring mobile node 12. The variable beacon signals may vary in at least one of transmission rate, transmission frequency and transmission pattern as discussed above, and the method may include (block 208) changing a detection frequency from the initial detection frequency while searching for the variable beacon signals. The method may also include (block 210) determining a type of variable beacon signal being transmitted from a neighboring mobile node 12 by processing beacon signal information received from the neighboring mobile node via a beacon properties signal, before ending at block 212.

Figure 3:
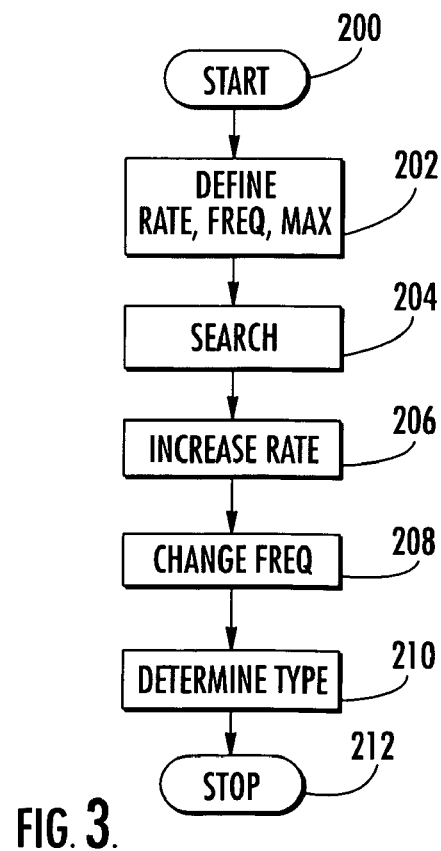
FIG. 3 is a schematic diagram illustrating a router of a node in accordance with the network of the present invention.
Figure 4:
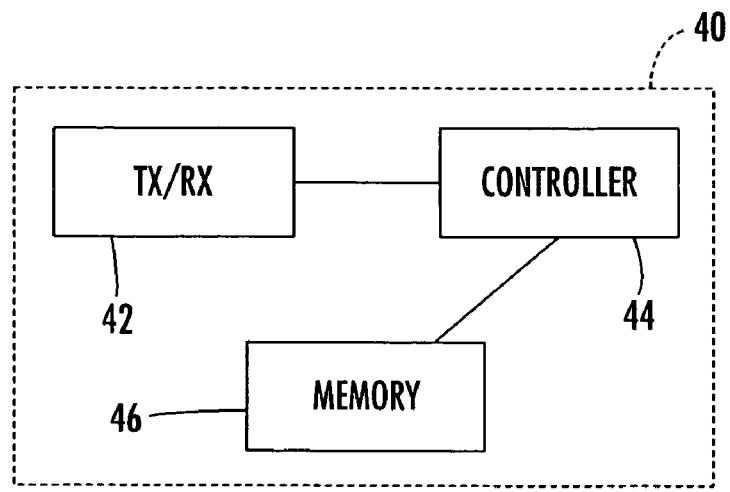
FIG. 4 is a schematic diagram illustrating the details of the controller of the router in FIG. 3.
Figure 5:
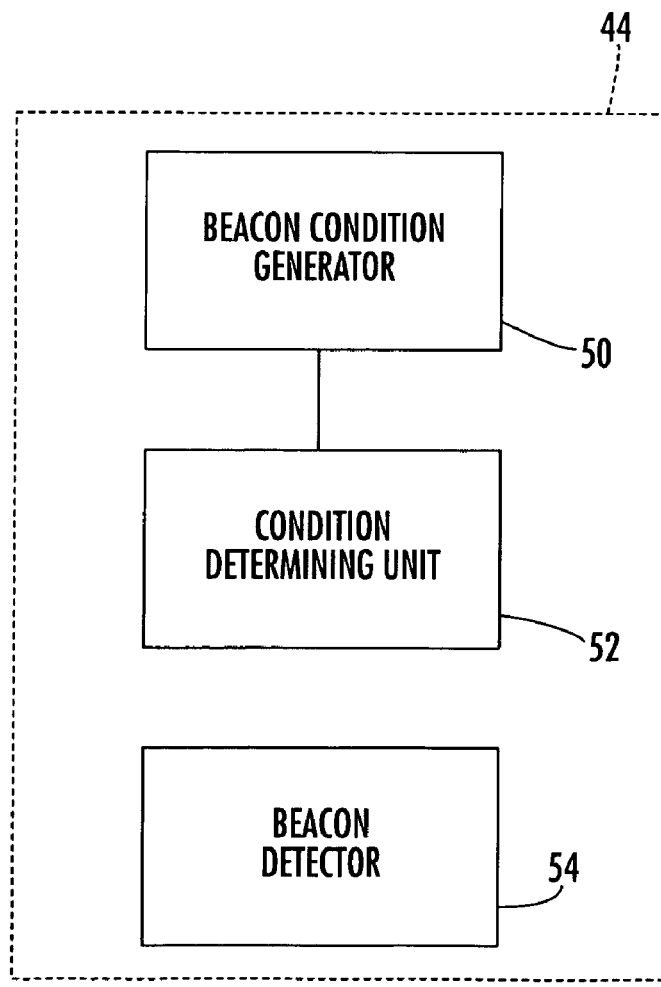
FIG. 5 is a schematic diagram illustrating the details of the controller of the router in FIG. 4.

A system aspect of the invention will now be described with further reference to FIGS. 3 and 4. As discussed, the mobile ad hoc network 10 has a plurality of wireless mobile nodes 12, and a plurality of wireless communication links 14 connecting the nodes together. Each mobile node 12 includes a router 40 that has a communications device 42 to wirelessly communicate with other nodes of the plurality of nodes via the wireless communication links 14. Also, the router 40 includes a controller 44 to route communications via the communications device 42. Also, a memory 46 may be included as part of the controller 44 or in connection with the controller.

The controller 44 includes at least a beacon signal generator 50 to generate and transmit beacon signals, and a condition determining unit 52 to determine a condition of the mobile node 12. The beacon signal generator 50 varies the beacon signals based upon the determined condition of the mobile node 12. Again, the beacon signals include information relating to a condition of the mobile node 12. The beacon signals may further include information relating to a status of a group G of mobile nodes 12 which, as discussed above, are a temporary or permanent association of at least two of the plurality of mobile nodes 12.

Here, the condition determining unit 52 further determines a condition of the group G of mobile nodes 12, and the beacon signal generator 50 varies the beacon signals based upon the determined condition of the group G of mobile nodes 12. Again, the beacon signal is made up of transmission rate, transmission frequency and transmission pattern.

The node/group condition may include node/group movement, and the beacon signal generator 50 may vary the beacon signals by increasing the transmission rate or changing the transmission frequency or pattern based upon increased node/group movement and decreasing the transmission rate or changing the transmission frequency or pattern based upon decreased node/group movement. The node/group movement includes node/group velocity, node/group acceleration and/or node/group movement pattern of the corresponding mobile node 12 or group G of nodes. The condition determining unit 52 may comprise a global positioning satellite (GPS) device for determining the node/group movement, and/or may determine the node/group movement using local landmarks, by tracking the relative velocity using triangulation and/or by measuring inertia of the mobile node 12 or group of nodes G.

Furthermore, the node/group condition may include quality of service (QoS) and/or priority of information, and the beacon signal generator 50 varies the beacon signals by increasing the transmission rate and/or changing the transmission frequency or pattern based upon decreased QoS or increased priority of information and decreasing the transmission rate or changing the transmission frequency or pattern based upon increased QoS and/or decreased priority of information. The beacon signal generator 50 should not increase the transmission rate of the beacon signals beyond a rate threshold based upon available bandwidth. Again, the beacon signals may also include information relating to a condition of the mobile ad hoc network 10, such as information about the links 14 connecting the nodes 12 of the network. Additionally, the beacon signal generator 50 may transmit beacon signal information using a beacon properties signal to advertise a type of beacon signal being transmitted to the plurality of nodes 12 of the mobile ad hoc network 10.

A beacon signal detector 54 is included to search for the variable beacon signals at a detection rate, which is increased from an initial detection rate up to a maximum detection rate, and at an initial detection frequency. The maximum detection rate may be predetermined or based upon a received maximum detection rate transmitted by a neighboring mobile node 12. The beacon signal detector 54 may increase the detection rate according to a function defining time varying properties of the variable beacon signal of a neighboring mobile node 12, and may determine a type of variable beacon signal being transmitted from a neighboring mobile node 12 by processing beacon signal information received from the neighboring mobile node via a beacon properties signal.

Again, it should be understood that blocks of the illustrations, and combinations of blocks in the illustrations, can be implemented by computer program instructions which may be provided to a processor to implement the functions specified in the block or blocks.

In sum, ICBF defines the fundamental framework for development of multiple types of beacons and the corresponding beacon detection mechanisms. One such general capability bestowed upon beacons to account for node movement is a mechanism to accept and intelligently process the velocity and acceleration of a NCOA or group G of nodes 12. As either or both of these increase, the NCOA beacon rate is increased so that listening nodes 12 can adjust their route tables (caches) in time to mark affected routes as stale before they are used to try to send information over. ICBF should not permit a beacon rate to increase to the point of reducing the useful bandwidth of a necessary link 14, so rules to limit this appropriately will come into effect when triggered.

ICBF defines the framework for other "built-in" network detection parameter detection mechanisms to be defined and linked into the system for adjusting a NCOA beacon waveform. Examples are rate of change of bit errors on a channel, rate of change of the effective bandwidth, rate of change of the number of NCOAs/individual nodes in the neighborhood of S, etc.

ICBF includes interface mechanisms to send information to the network's current routing algorithm to stimulate the creation of new routes at more optimal times than what conventional neighbor discovery beacons would allow. This mechanism also increases the likelihood that routes that are in the process of being created will be valid by the time the entire route is determined.

ICBF defines a "Broadband Beacon Rate Ramp" ($B^2R^2$) search as a default mechanism that enables network or non-network nodes 12 or groups of nodes G to detect these variable beacons. $B^2R^2$ Begins with some initial value of the search rate at some initial beacon frequency. From that point in time on, $B^2R^2$ uses one of several possible tactics for searching for beacons. Examples of such tactics specified by ICBF include: a predefined, fixed maximum detector rate; the maximum detector rate which is passed by the transmitting nodes to other nodes at convenient times; a function specifying the time varying properties of the beacon rate of a given node; and "Beacon Channel Surfing" in which beacon detectors can "surf" across multiple communications channels for a beacon if the network's NCOA/node beacon transmit tactic be that of distributing each NCOA/node beacon across multiple communications channels (This could be useful for security and to avoid noisy channels).

ICBF provides the association of a NCOA/node with a predefined beacon and for advertising the type of beacon to the network so appropriate beacon detectors can be chosen. For each type of NCOA/node beacon waveform, a corresponding beacon detector may be defined which is adaptable to the potential variability of the NCOA/node beacon. Beacons are dynamically adaptable, intelligently or nonintelligently, to conditions that affect the ability of the object to be known to its neighbors. Node movement (velocity, acceleration, pattern) and QoS are examples of such classes of conditions that could possibly affect the beacon transmission rate, transmit frequency and pattern (collectively these three characteristics make up the beacon's waveform).

ICBF distributes the burden of routing to include neighbor discovery beacons capable of carrying intelligence and knowledge about network conditions, capable of using knowledge about the network and capable of intelligently interacting with NCOAs and individual nodes. ICBF could support enhanced 3G, 4G, 5G and beyond communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for node advertisement in a mobile ad hoc network comprising a plurality of wireless mobile nodes and a plurality of wireless communication links connecting the nodes together, the method comprising:
   transmitting node condition information from a given mobile node using a beacon signal;
   determining a node condition of the given mobile node, the node condition including priority of information to be transmitted by the given mobile node; and
   varying the beacon signal by changing a transmission characteristic based upon changes in priority of information to be transmitted by the given mobile node.

2. A method according to claim 1 wherein the transmission characteristic comprises at least one of transmission rate, transmission frequency and transmission pattern.

3. A method according to claim 2 wherein the node condition includes node movement, and varying the beacon signal comprises increasing the transmission rate based upon increased node movement and decreasing the transmission rate based upon decreased node movement.

4. A method according to claim 3 wherein the node movement comprises at least one of node velocity, node acceleration and node movement pattern of the corresponding mobile node.

5. A method according to claim 3 wherein the node movement is determined using global positioning satellites (GPS).

6. A method according to claim 3 wherein the node movement is determined using local landmarks.

7. A method according to claim 3 wherein the node movement is determined by tracking relative velocity using triangulation.

8. A method according to claim 3 wherein the node movement is determined by measuring inertia of the mobile node.

9. A method according to claim 2 wherein the node condition includes quality of service (QoS), and varying the beacon signal comprises changing at least one of the transmission rate, the transmission frequency and the transmission pattern based upon changes in QoS.

10. A method according to claim 2 wherein the transmission rate of the beacon signal does not exceed a rate threshold based upon available bandwidth.

11. A method according to claim 1 wherein the beacon signal further includes information relating to a condition of the mobile ad hoc network.

12. A method according to claim 11 wherein the information relating to the condition of the mobile ad hoc network includes information about the links connecting the nodes of the mobile ad hoc network.

13. A method according to claim 1 further comprising transmitting beacon signal information from the given mobile node using a beacon properties signal to advertise a type of beacon signal being transmitted by the given mobile node to the plurality of nodes of the mobile ad hoc network.

14. A method for node advertisement by a group of mobile nodes in a mobile ad hoc network comprising a plurality of wireless mobile nodes and a plurality of wireless communication links connecting the nodes together, the group of mobile nodes comprising a temporary or permanent associated of at least two of the plurality of mobile nodes, the method comprising:
   transmitting group condition information from at least one of the mobile nodes of the group using a beacon signal;
   determining a group condition of the group of mobile nodes, the group condition including priority of information to be transmitted by the group of mobile nodes; and
   varying the beacon signal by changing at least one of transmission rate, transmission frequency and transmission pattern based upon changes in priority of information to be transmitted by the group of mobile nodes.

15. A method according to claim 14 wherein the group condition includes quality of service (Qos), and varying the beacon signal comprises changing at least one of the transmission rate, transmission frequency and transmission pattern based upon changes in QoS.

16. A method according to claim 14 wherein the transmission rate of the beacon signal does not exceed a rate threshold based upon available bandwidth.

17. A method according to claim 14 wherein beacon signals are transmitted by a subset of mobile nodes of the group of mobile nodes, the subset comprising a range from one mobile node to all the mobile nodes of the group.

18. A method according to claim 14 wherein the beacon signals further includes information relating to a condition of the mobile ad hoc network.

19. A method according to claim 18 wherein the information relating to the condition of the mobile ad hoc network includes information about the links connecting the nodes of the mobile ad hoc network.

20. A method according to claim 14 further comprising transmitting beacon signal information from the at least one mobile node using a beacon properties signal to advertise a type of beacon signal being transmitted by the at least one mobile node to the plurality of nodes of the mobile ad hoc network.

21. A method according to claim 14 wherein the group condition further includes group movement, and wherein varying the beacon signal comprises increasing the transmission rate based upon increased group movement and decreasing the transmission rate based upon decreased group movement.

22. A method according to claim 21 wherein the group movement comprises at least one of group velocity, group acceleration and group movement pattern of the group of mobile nodes.

23. A mobile ad hoc network comprising:
   a plurality of wireless mobile nodes;
   a plurality of wireless communication links connecting the nodes together;

each mobile node comprising
a communications device to wirelessly communicate with other nodes of the plurality of nodes via the wireless communication links, and
a controller to route communications via the communications device, and comprising
a beacon signal generator to generate and transmit node condition information using a beacon signal; and
a condition determining unit to determine a condition of the mobile node, the node condition including priority of information to be transmitted by the mobile node;
the beacon signal generator varying the beacon signal by changing a transmission characteristic based upon changes in priority of information to be transmitted by the mobile node.

24. The network according to claim 23 wherein the beacon signal further includes information relating to a status of a group of mobile nodes, the group of mobile nodes comprising a temporary or permanent association of at least two of the plurality of mobile nodes; wherein the condition determining unit further determines a condition of the group of mobile nodes; and wherein the beacon signal generator varies the beacon signal based upon the determined condition of the group of mobile nodes.

25. A network according to claim 23 wherein the transmission characteristic comprises at least one of transmission rate, transmission frequency and transmission pattern.

26. A network according to claim 25 wherein the node condition includes node movement, and the beacon signal generator varies the beacon signal by increasing the transmission rate based upon increased node movement and decreasing the transmission rate based upon decreased node movement.

27. A network according to claim 26 wherein the node movement comprises at least one of node velocity, node acceleration and node movement pattern of the corresponding mobile node.

28. A network according to claim 26 wherein the condition determining unit comprises a global positioning satellite (GPS) device for determining the node movement.

29. A network according to claim 26 wherein the condition determining unit determines the node movement using local landmarks.

30. A network according to claim 26 wherein the condition determining unit determines the node movement by tracking the relative velocity using triangulation.

31. A network according to claim 26 wherein the condition determining unit determines the node movement by measuring inertia of the mobile node.

32. A network according to claim 25 wherein the node condition includes quality of service (QoS), and the beacon signal generator varies the beacon signal by at least one of changing the transmission rate and changing the transmission frequency based upon changes in QoS.

33. A network according to claim 25 wherein the beacon signal generator does not increase the transmission rate of the beacon signal beyond a rate threshold based upon available bandwidth.

34. A network according to claim 23 wherein the beacon signal further includes information relating to a status of the mobile ad hoc network.

35. A network according to claim 34 wherein the information relating to the status of the mobile ad hoc network includes information about the links between the nodes of the mobile ad hoc network.

36. A network according to claim 23 wherein the beacon signal generator transmits beacon signal information using a beacon properties signal to advertise a type of beacon signal being transmitted to the plurality of nodes of the mobile ad hoc network.

37. A method for node advertisement by a group of mobile nodes in a mobile ad hoc network comprising a plurality of wireless mobile nodes and a plurality of wireless communication links connecting the nodes together, the group of mobile nodes comprising a temporary or permanent associated of at least two of the plurality of mobile nodes, the method comprising:
transmitting group condition information from at least one of the mobile nodes of the group using a beacon signal;
determining a group condition of the group of mobile nodes, the group condition including priority of information to be transmitted by the group of mobile nodes; and
varying the beacon signal by changing a transmission characteristic based upon changes in priority of information to be transmitted by the group of mobile nodes.

38. A method according to claim 37 wherein the transmission characteristic comprises at least one of transmission rate, transmission frequency and transmission pattern.

39. A method according to claim 38 wherein the group condition includes quality of service (QoS), and varying the beacon signal comprises changing at least one of the transmission rate, transmission frequency and transmission pattern based upon changes in QoS.

40. A method according to claim 38 wherein the transmission rate of the beacon signal does not exceed a rate threshold based upon available bandwidth.

41. A method according to claim 37 wherein beacon signals are transmitted by a subset of mobile nodes of the group of mobile nodes, the subset comprising a range from one mobile node to all the mobile nodes of the group.

42. A method according to claim 37 wherein the beacon signals further includes information relating to a condition of the mobile ad hoc network.

43. A method according to claim 42 wherein the information relating to the condition of the mobile ad hoc network includes information about the links connecting the nodes of the mobile ad hoc network.

44. A method according to claim 37 further comprising transmitting beacon signal information from the at least one mobile node using a beacon properties signal to advertise a type of beacon signal being transmitted by the at least one mobile node to the plurality of nodes of the mobile ad hoc network.

* * * * *

UNITED STATES PATENT AND TRADEMARK OFFICE
CERTIFICATE OF CORRECTION

PATENT NO. : 6,975,614 B2
APPLICATION NO. : 10/235242
DATED : December 13, 2005
INVENTOR(S) : Robert A. Kennedy It is certified that error appears in the above-identified patent and that said Letters Patent is hereby corrected as shown below:

<u>Title page,</u>
Item [57], ABSTRACT,
Line 4, delete "or group" insert -- or a group --.

<u>Column 1,</u>
Line 17, delete "type" insert -- types --.
Line 53, delete "multicasting, protocols" insert -- multicasting protocols --.

<u>Column 3,</u>
Line 46, delete "vary beacon" insert -- vary the beacon --.

<u>Column 5,</u>
Line 54, delete "Association:" insert -- Association --.

<u>Column 6,</u>
Line 6, delete "transmiting" insert -- transmitting --.

<u>Column 8,</u>
Line 46, delete "Begins" insert -- begins --.

<u>Column 10,</u>
Line 41, delete "signals" insert -- signal --.

<u>Column 12,</u>
Lines 17-18, delete "associated" insert -- association --.
Line 46, delete "signals" insert -- signal --.

Signed and Sealed this

Twentieth Day of June, 2006

JON W. DUDAS
*Director of the United States Patent and Trademark Office*